UNITED STATES PATENT OFFICE.

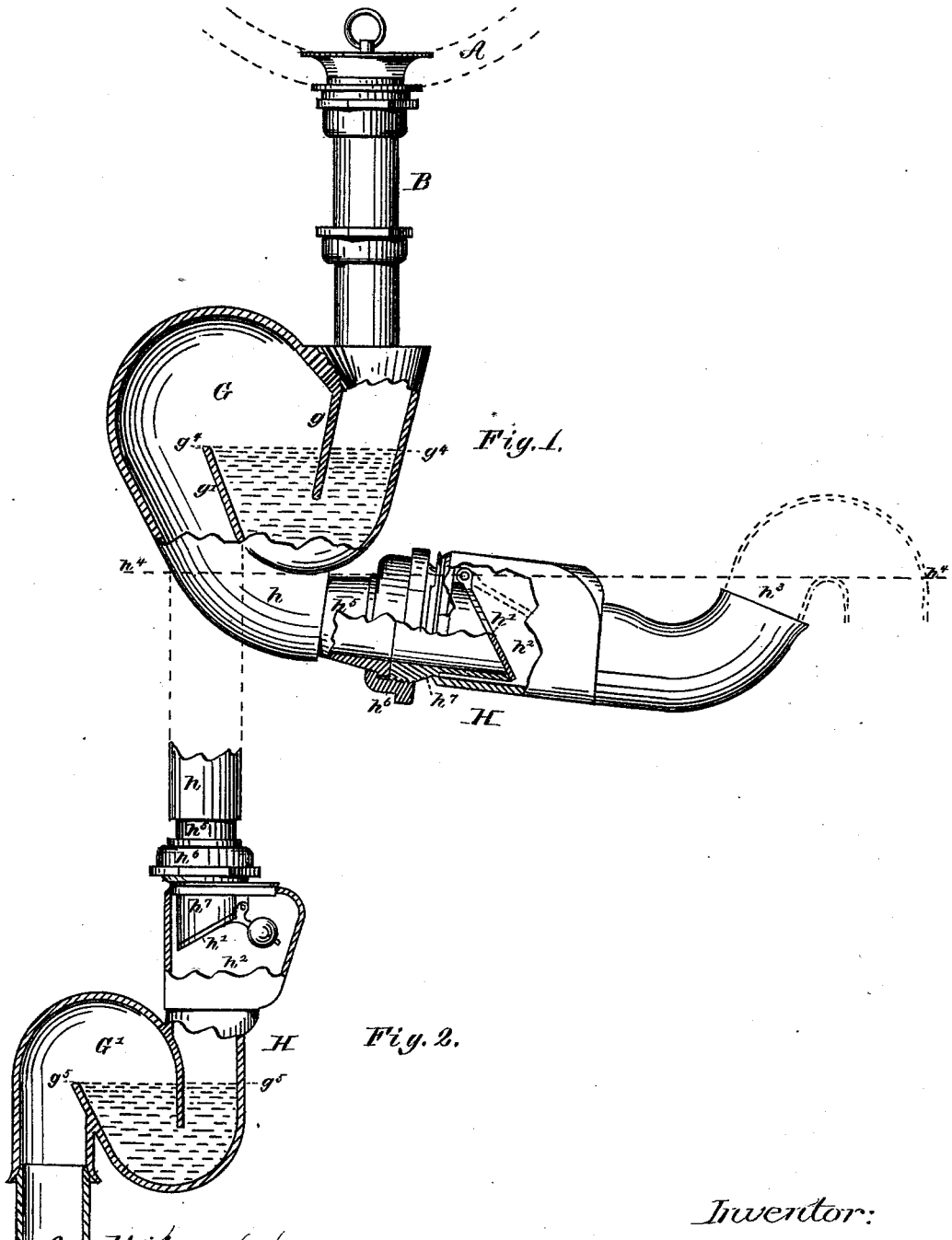

HENRY W. ATWATER, OF NEWTON, MASSACHUSETTS.

IMPROVEMENT IN TRAPS FOR WASTE-PIPES FROM WASH-BASINS, &c.

Specification forming part of Letters Patent No. 214,985, dated May 6, 1879; application filed January 29, 1879.

*To all whom it may concern:*

Be it known that I, HENRY W. ATWATER, of Newton, in the county of Middlesex and State of Massachusetts, have invented certain Improvements in Traps for Waste-Pipes from Wash-Bowls, Bath-Tubs, and the like, of which the following is a full, clear, concise, and exact description, reference being had to the accompanying drawings, making a part hereof.

Of late years much attention has been given to that kind of plumbing now well known as "sanitary plumbing," so called for the reason that it has for its main object the construction of waste-pipes in such a manner as to prevent them from serving as conduits from the sewer into the house, and confine them to their proper functions as conduits from the house into the sewer.

My invention relates to this sanitary plumbing, as its chief object is to provide an escape-pipe which, while it gives free vent to the waste-water into the sewer or drain, will effectually prevent the gas or odors of the drain or sewer passing up through it; but the especial object of my invention is to do this in such a practical way as to guard effectually against leakage.

My invention consists, mainly, in the combination of two traps, one of which is provided with a valve opening toward the sewer, and so constructed as to have a column of water on both sides of this valve, as will be more fully described below.

A second feature of my invention is the valve-trap above mentioned.

In the drawings, Figure 1 is an elevation, partly in section, of devices embodying all the features of my invention. Fig. 2 shows another method of applying my invention, more fully described below.

The trap G is of one casting, usually of lead. It is self-cleansing, as the partitions $g$ and $g^1$ are thin walls, and the wall $g^1$ flares away from the wall $g$, as shown. The dotted line $g^4$ indicates the water-level in this trap.

The discharge-pipe $h$ of trap G enters the trap H, and the inlet-pipe of trap H is provided with a valve, $h^1$, which opens outward, as shown, into the chamber $h^2$. The exit $h^3$ of this chamber $h^2$ rises, so as to bring the water-level in trap H on the dotted line $h^4$ in Fig. 1. It follows, therefore, that there is a column of water on each side of valve $h^1$.

The best method known to me of forming trap H is as follows: $h^5$ is a nipple inserted in pipe $h$, and connected by the nut $h^6$ to the pipe $h^7$. The chamber $h^2$ is soldered onto pipe $h^7$. By means of the nut $h^6$ the parts of trap H can be readily detached.

In case of any reflux from the drain or sewer the pressure comes first upon the surface of the water in the outlet-pipe from chamber $h^2$; but the water cannot be expelled from this chamber by reason of the valve $h^1$. Any stench from the sewer will be trapped (as effectually as by the ordinary trap) by the trap H; but should any odors pass through the trap H, (as occurs in many cases by reason of the water in the trap becoming impregnated with and giving off the odors,) the odors thus given off will be effectually trapped by trap G, the water in which is not exposed to any gas or odors except what can pass by trap H.

One of the traps H will, as will be obvious, suffice to receive the discharge-pipes from several traps.

When the trap H is mainly vertical, as in Fig. 2, the valve $h^1$ should be counterbalanced. In this figure the water is on each side of valve $h^1$, but not in contact with it, there being a third trap, G', below the trap H, which, being in its construction like the trap G, will hold water up to the level $g^5$, and therefore prevent any appreciable quantity of gas from passing into the chamber $h^2$, thus making this method of applying my invention as effectual as the method first above described in preventing the passage of the sewer-gas into the house.

My improvements are very simple and are easily applied, and it requires very little trouble to keep them in order.

What I claim as my invention is—

1. In combination, the upper trap and the lower trap, with the valve $h^1$ between them, so that a column of water will be on each side of the valve, all substantially as described.

2. In combination, the inlet-pipe $h$, valve $h^1$, chamber $h^2$, and outlet-pipe $h^3$, a portion of the inlet-pipe and the bottom of the outlet-pipe being above the valve, in order that a column of water will be on each side of and in contact with the valve when in use, all substantially as described.

HENRY W. ATWATER.

Witnesses:
J. E. MAYNADIER,
GEORGE O. G. COALE.